United States Patent [19]

Friend et al.

[11] Patent Number: 4,634,855

[45] Date of Patent: Jan. 6, 1987

[54] PHOTOELECTRIC ARTICLE SENSOR WITH FACING REFLECTORS

[75] Inventors: Kenneth D. Friend; Vijay M. Dharia, both of Cedar Falls, Iowa

[73] Assignee: Deere & Company, Moline, Ill.

[21] Appl. No.: 649,098

[22] Filed: Sep. 10, 1984

[51] Int. Cl.[4] .............................................. G01V 9/04
[52] U.S. Cl. ............................ 250/222.1; 250/223 R
[58] Field of Search ............ 250/222.2, 223 R, 222.1, 250/221; 356/335, 338, 336, 337, 339, 340-343; 377/53, 10, 11

[56] References Cited

U.S. PATENT DOCUMENTS

| | | | |
|---|---|---|---|
| 2,803,756 | 8/1957 | Cox | 250/223 R |
| 3,537,091 | 10/1970 | Schenkenberg . | |
| 3,648,054 | 3/1972 | Nance | 250/223 R |
| 3,890,221 | 6/1975 | Muehlethaler | 250/222.2 |
| 3,928,751 | 12/1975 | Fathauer . | |
| 4,054,779 | 10/1977 | Wilke | 377/53 |
| 4,096,424 | 6/1978 | Hysler | 250/223 R |
| 4,150,286 | 4/1979 | Toll et al. | 250/223 R |
| 4,163,507 | 8/1979 | Bell . | |

*Primary Examiner*—David C. Nelms
*Assistant Examiner*—Michael Messinger

[57] ABSTRACT

A sensor for counting articles, such as seeds, moving through a conduit includes an array of infrared LEDs generating a uniform diffuse beam of radiation which entirely illuminates a cross sectional volume of the conduit. The beam is detected by a planar photo diode which extends across the opposite side of the conduit. A pair of mirrors extend along opposite sides of the conduit between the array and the photo diodes. Slits narrow the beam and limit the amount of radiation which can impinge upon the photo diode. The signal from the photo diode is integrated by a signal processing unit so that the sensor can count a plurality of seeds in a group of seeds which simultaneously pass through the beam. The signal processing unit automatically compensates for changes in the steady state photo-diode output and for changes in seed size.

14 Claims, 11 Drawing Figures

PHOTOELECTRIC ARTICLE SENSOR WITH FACING REFLECTORS

BACKGROUND OF THE INVENTION

This invention relates to an article counter or sensor for sensing and counting articles such as seeds flowing in a chute in a seed planter.

Optical seed sensors in which a seed interrupts a radiation or light beam are known in the art. Such systems are described in U.S. Pat. Nos. 4,163,507 (Bell), 3,537,091 (Schenkenberg), 3,928,751 (Fathauer), 3,723,989 (Fathauer et al), 4,166,948 (Steffen), 3,974,377 (Steffen) and 4,246,469 (Merlo). For a number of reasons, such seed sensors have been inaccurate. One problem has been the spatial non-uniformity of the light source and/or of the light detectors so that signals generated by the light detectors vary, depending upon what portion of the light beam is interrupted. Another problem is that such sensors have usually been coupled to circuits, such as the differentiating circuit of U.S. Pat. No. 4,163,507, which essentially count pulses in the detector output and therefore, such systems count a plurality of seeds simultaneously traversing the light beam as a single seed.

SUMMARY OF THE INVENTION

An object of the present invention is to provide an accurate sensor for counting small articles, such as seeds, flowing through a conduit.

Another object of the present invention is to provide an article or seed counter which can sense and count a plurality of seeds in a group of seeds which simultaneously pass through the sensor.

Another object of this invention is to provide such a sensor which responds uniformly to articles or seeds, substantially independent of their position as they traverse the sensor.

Another object of the invention is to determine time spacing of the articles for use in the testing of planter seed metering devices.

These and other objects are achieved by the present invention which includes an array of infrared LEDs extending across one side of an article or seed conduit. The array generates a substantially diffuse and uniform radiation beam which is detected by planar photo diodes which extend across the opposite side of the conduit. A pair of oppositely facing mirrors extend between the array and the photo diodes and reflect the LED radiation back into the conduit. Slits between the array and the conduit and between the conduit and the photo diodes narrow the beam which the articles traverse and prevent extraneous radiation from impinging upon the photo diodes.

With the diffuse, uniform and extended radiation beam produced by the LED array, all articles passing through the detector have a nearly equal effect on the amount of radiation received by the photo diodes, even when multiple articles are tightly bunched together, even when multiple articles pass simultaneously through the beam, and even when one article is in the partial "shadow" of another article which is between the one article and the array. The signal from the photo diodes has a substantially linear relationship to the total amount of radiation which falls on them, and thus, also has a similar relationship to the quantity of articles which interrupt the beam inside the detector.

The signal from the photo diodes is processed by an electronic unit which includes a current-to-voltage converter, an A/D converter and a microprocessor. The microprocessor executes an algorithm which accurately counts the articles which pass through the beam by repetitively integrating a value derived from the signal from the photo diodes. The algorithm compensates for changes in the steady-state signal produced by the photo diodes when no articles are in transit through the beam, and determines the number of articles in groups of articles which simultaneously pass through the beam. The algorithm also compensates for gradual changes in average article or seed size.

DETAILED DESCRIPTION

Figure 1:
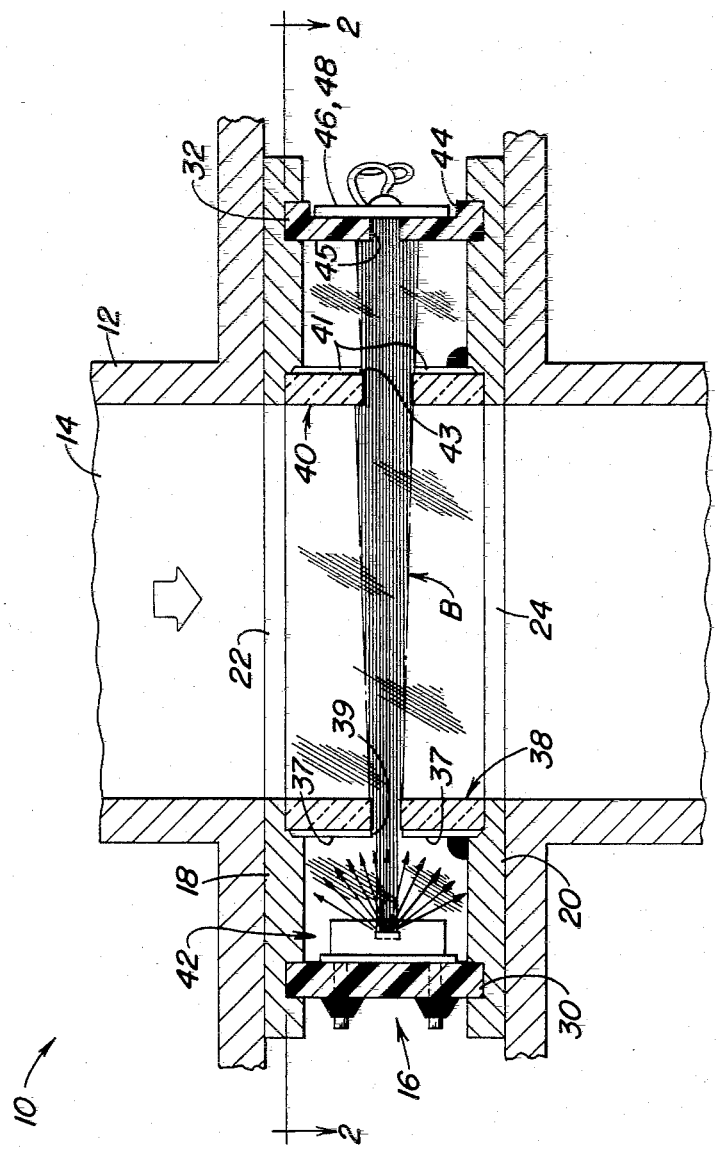
FIG. 1 is a sectional side view of applicants' article or seed sensor.

An article or seed sensor 10 includes a conduit 12 which forms an article or seed flow passage 14 and which receives a sensor module 16. Sensor module 16 includes a top 18 and a base 20, each having rectangular openings 22 and 24 which register with the seed flow passage 14.

The sensor module 16 also includes opaque end plates 26 and 28 (see FIG. 2), opaque side plates 30 and 32, mirrors 34 and 36, and glass windows 38 and 40, all held in grooves on the inner surfaces of the top 18 and base 20.

The side plate 30 supports an array 42 (at least 3 and preferably 7) of radiation generators CR1–CR7. Various known radiation emitting devices could be suitable, but infrared light generators are preferred because of the dust-penetrating ability of infrared radiation. A suitable device is the Siemens No. SFH 407-3 GaAs infrared light emitting diode (LED). Preferably, plate 30 is a PC board with conductive strips forming electrical connections with the LEDs CR1–CR7 mounted thereon.

Figure 2:
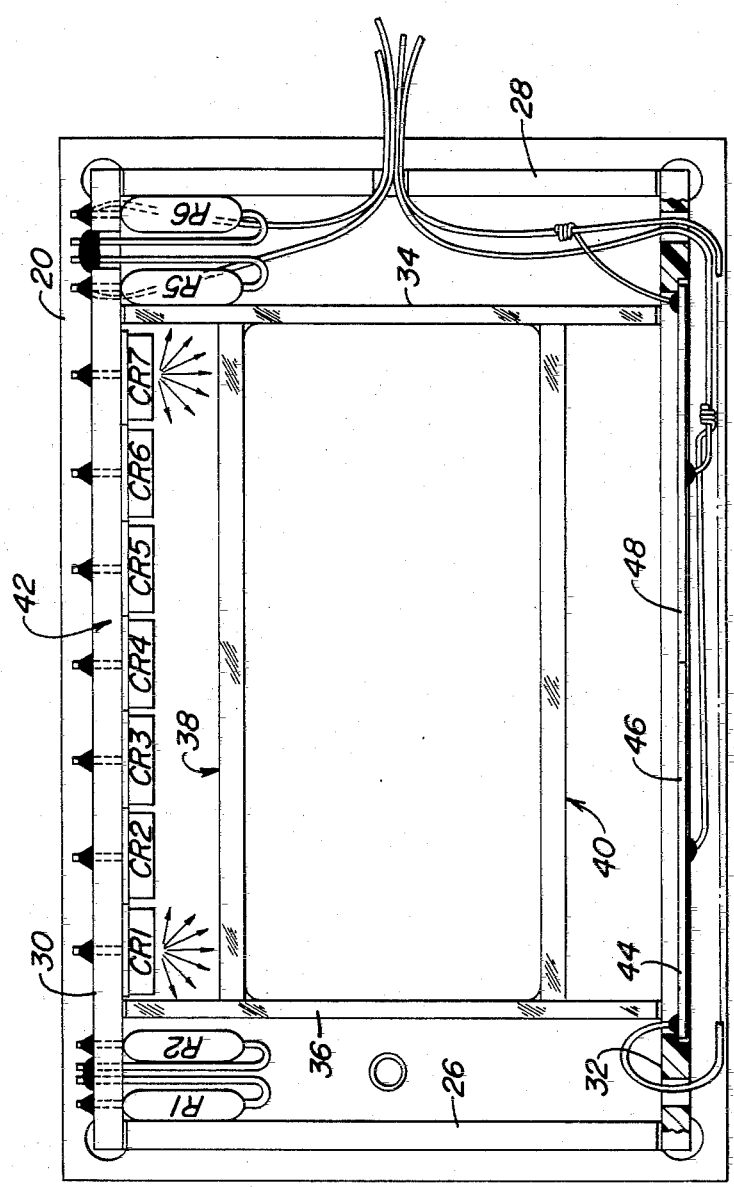
FIG. 2 is a partial sectional view taken along lines 2—2 of FIG. 1, with parts removed for clarity.
Figure 3:
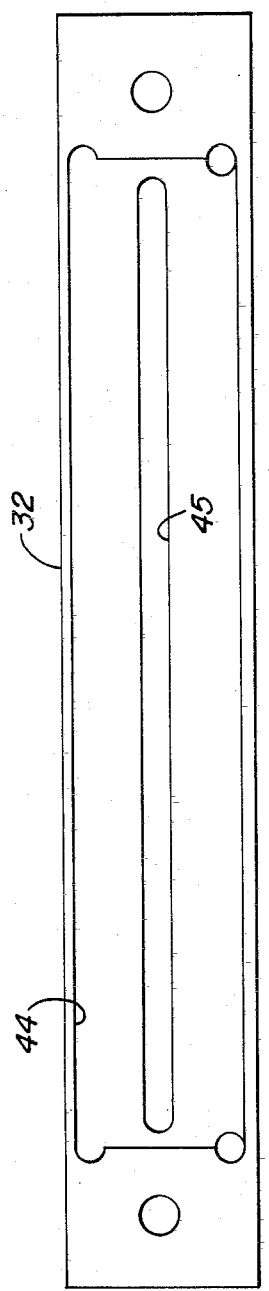
FIG. 3 is a view of the photo diode mounting plate looking towards the LED array with the photo diodes removed.

As best seen in FIG. 2, this array of LEDs extends substantially across the entire length of the seed flow path 14 and transversely to the direction of seed flow which is downwards, viewing FIG. 1. The radiation beam generated by each LED has a wide angular dispersion approaching that of a point light source mounted on a planar surface. Thus, the beams from adjacent pairs of the LEDs intersect with each other well before they reach the nearest window 38. This assures that all areas in the seed flow path between windows 38 and 40 are illuminated.

The end plate 32 is preferably made of opaque black plastic and has a rectangular recess 44 which receives a pair of flat planar detectors or photo diodes 46 and 48 for generating electrical signals in linear response to radiation received thereby. End plate 32 also includes a longitudinal slot or aperture 45, which has a width which is smaller than a typical dimension of the articles or seeds being sensed, (preferably 1 mm wide). Thus, slot 45 permits only a portion of the radiation from LED array 42 to impinge upon detectors 46 and 48. The slot 45 reduces the amount of ambient radiation (other than from array 42) which impinges upon detectors 46, 48. Slot 39 in window 38 narrows the angular spread of beam B to prevent the beam from reflecting off of articles or seeds which are outside of a small portion of the volume surrounded by mirrors 34 and 36 and windows 38 and 40.

Any detector which is responsive to the radiation generated by array 42 is suitable; however, in the case where infrared LEDs are used, then photo diodes, such as Type No. SP-652S made by Centronic, Inc., or the equivalent, are preferred. The end plate 32 and photo diodes 46 and 48 are positioned parallel to and spaced apart from the array 42 so that seeds traveling through seed passage 14 must pass between the array 42 and the photo diodes 46 and 48, thus varying the amount of radiation received thereby. The photo diodes 46 and 48 thus form a planar radiation detector which extends transversely with respect to the seed flow path across the longer dimension of the rectangular openings 22 and 24.

The radiation reflecting mirrors 34 and 36 are positioned parallel to each other on opposite sides of the seed flow path. Each mirror extends from an edge of side plate 30 to an edge of side plate 32. The mirrors 34 and 36 are preferably silvered or reflectively coated on the sides facing away from the seed flow path so that the reflective coatings will not be damaged due to abrasive contact with seeds.

Viewing FIG. 2, radiation from LEDs CR1 to CR7 which would otherwise be directed out of the path traversed by the seeds is reflected back into the seed path by mirrors 34 and 36. This has an effect similar to having the array 42 extend laterally beyond the plane of mirrors 34 and 36. The array 42 and the mirrors 34 and 36 cooperate to form a substantially diffuse, uniform and essentially extended radiation beam which enables the present detector to, in essense, "look behind" one seed to sense a seed which would otherwise be in the shadow of a seed which is closer to array 42.

Figure 4:
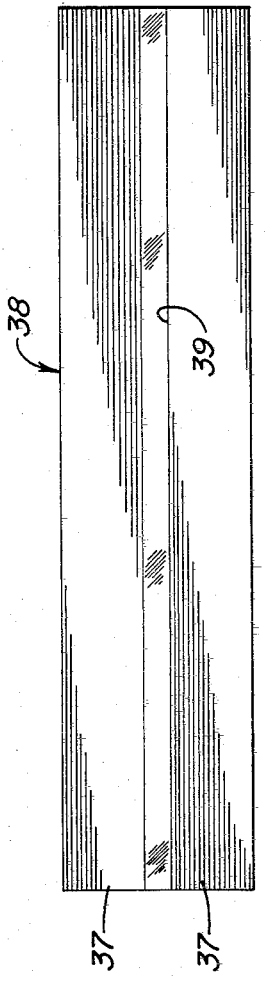
FIG. 4 is a side view of one of the radiation transmitting windows of the present invention.

The glass window 38 is spaced apart from and parallel with respect to the LED array 42 and is transparent to the infrared radiation emitted thereby and has its inward facing surface in line with an inner wall 50 of the conduit 12. The window 38 extends from mirror 34 to mirror 36. As best seen in FIGS. 1 and 4, window 38 has an opaque coating or mask 37 on the side nearest the LED array 42. A longitudinal gap 39 in the mask 37 forms a slit aperture, preferably around 1 mm wide, through which the radiation from array 42 is transmitted. The gap 39 extends the full length of window 38 between mirrors 34 and 36.

The window 40 is positioned parallel to the window 38 on the opposite side of the seed flow passage 14. The transparent glass window 40 has a radiation-blocking opaque mask 41 on the side facing away from seed passage 14. A longitudinal gap 43 in the mask 41 forms a slit aperture, preferably around 2 mm wide, through which the radiation from LED array 42 is transmitted.

The gap 43 also extends the full length of window 40 between mirror 34 and 36.

Figure 5:
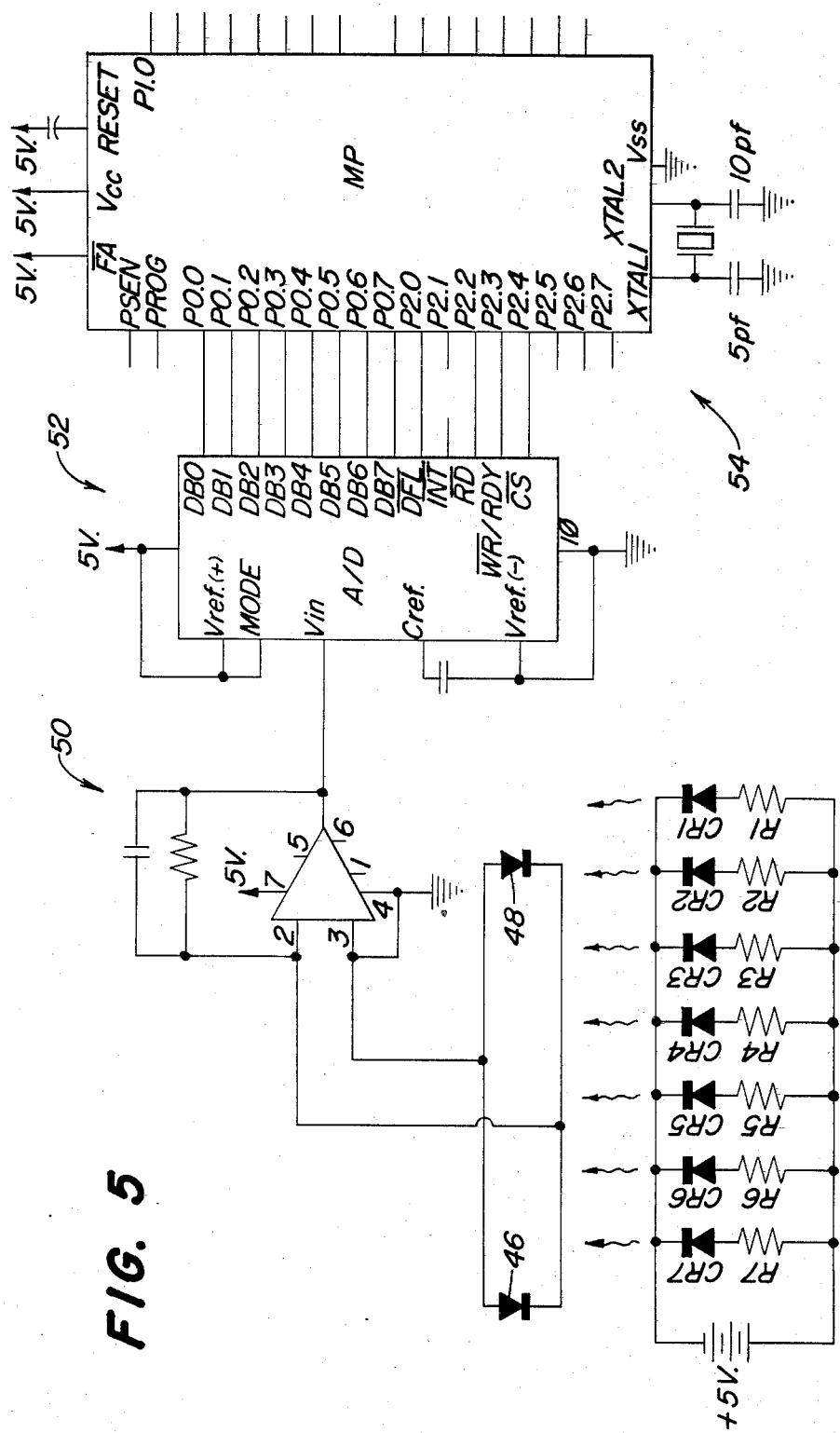
FIG. 5 is an electrical schematic of the signal processing unit utilized with the present invention.

As best seen in FIG. 5, each of LEDs CR1-CR7 is connected in series with a corresponding resistor R1-R7 and the resistor/LED pairs are then connected in parallel to a +5 volt power supply. The two detectors 46 and 48 are electrically connected in parallel. As best seen in FIG. 2, the resistors R1-R7 may be located in the spaces between mirrors 34 and 36 and end plates 28 and 26. The current signal from detectors 46 and 48 is received by a current-to-voltage amplifier 50. Preferably, amplifier 50 includes an operational amplifier (such as an RCA No. CA 3160), a 44 pf feedback capacitor C1 and a 562 kOhm feedback resistor. Amplifier 50 provides an analog voltage to the Vin input of conventional analog-to-digital converter 52 (such as a National Semiconductor ADC 0820). A/D converter 52 provides an 8-bit digital signal (representing the voltage at Vin) to the P0.0 to P0.7 inputs of microprocessor (micro) 54 (such as an Intel 8051). The A/D converter 52 starts an A-to-D conversion in response to a flag signal received at its $\overline{WR/RDY}$ input.

The micro 54 is supplied with a 12 MHz frequency from crystal oscillator 56. This frequency is divided internally to provide a 1 mHz machine instruction frequency. A timer (not shown), which is internal to the micro 54, counts the machine cycle frequency and generates a flag signal every 100 micro-seconds.

The micro 54 causes a new A/D conversion to be performed by converter 52 and executes an algorithm or instruction set every 100 micro-seconds in response to the occurrence of the flag signal.

Figure 6:
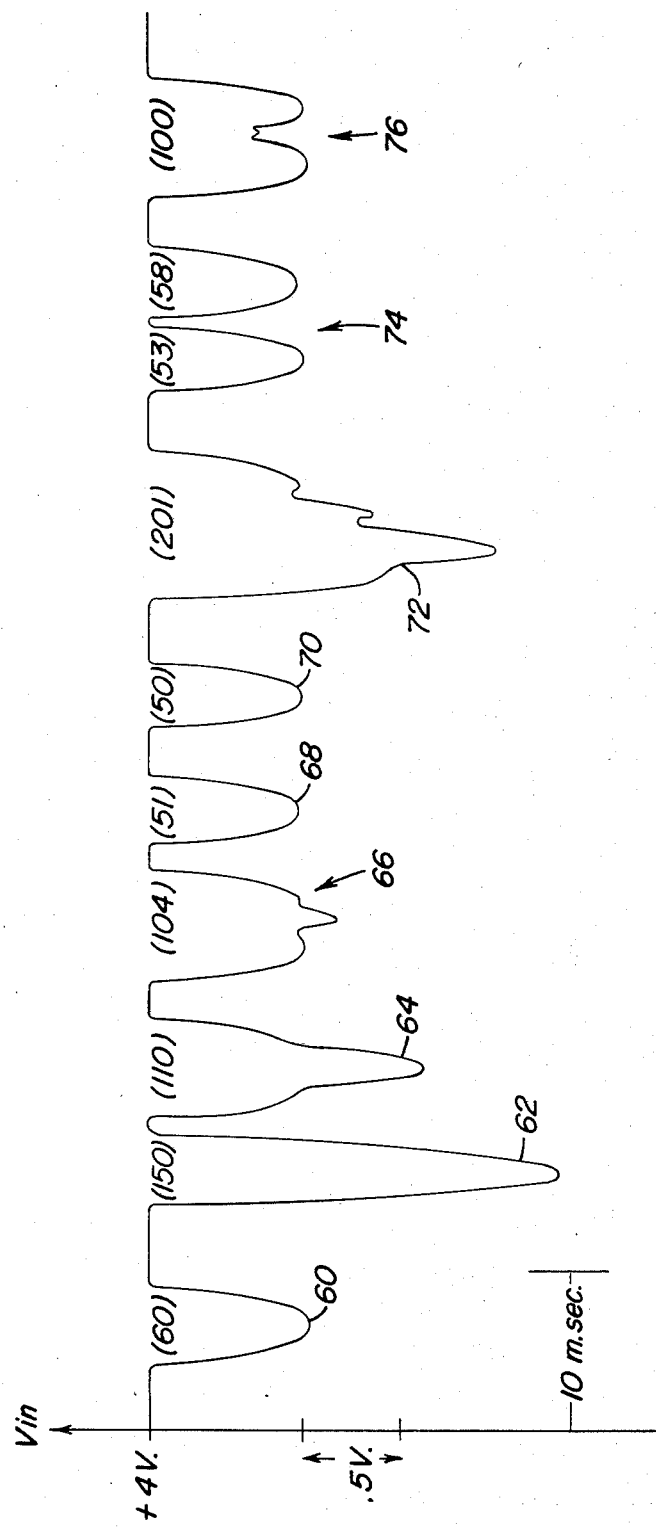
FIG. 6 is a signal timing diagram illustrative of signals which can be produced by transit of seeds through the present invention.
Figure 7A:
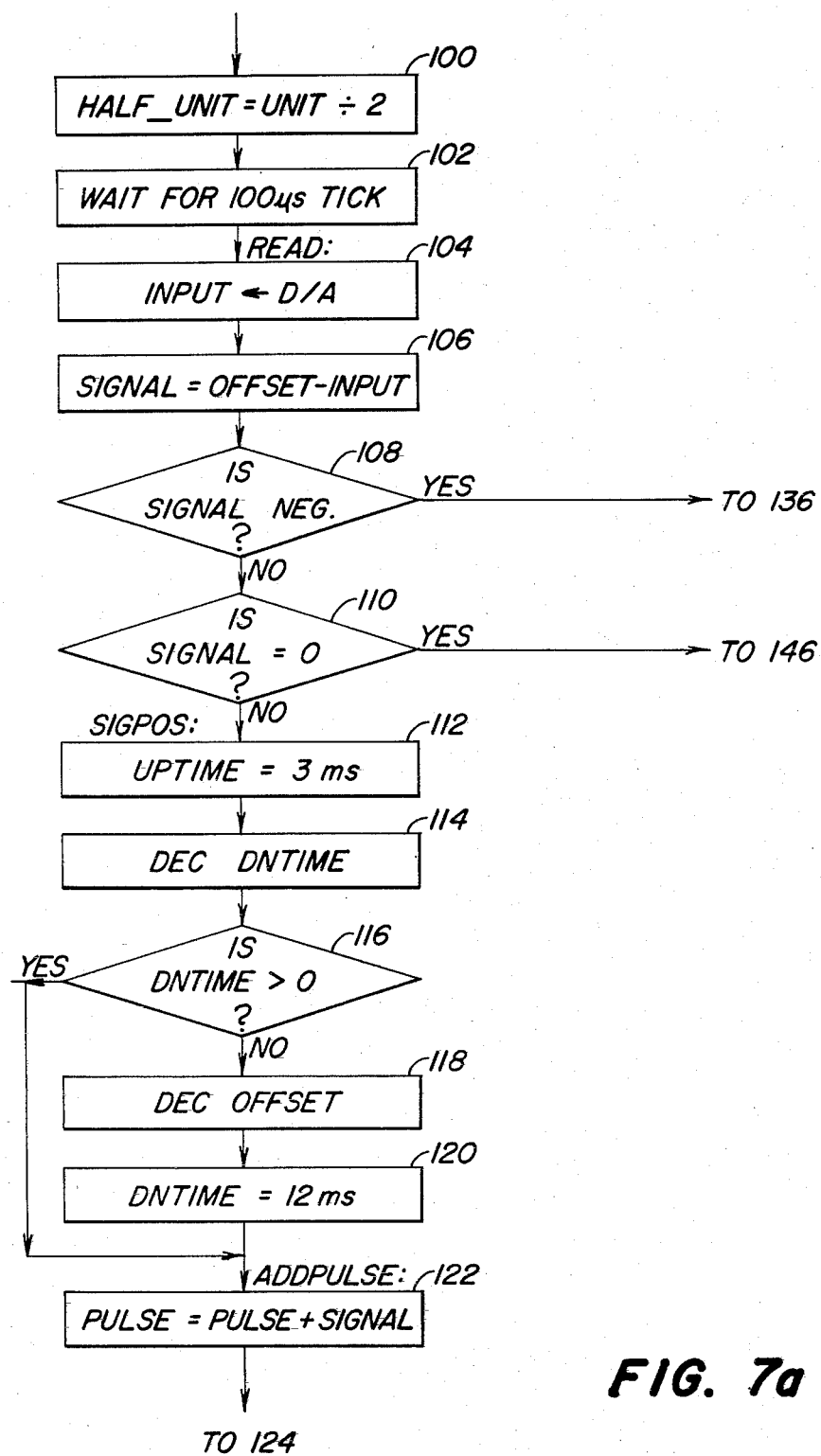
FIGS. 7a–7e contain a logic flow diagram of the signal processing algorithm executed by the signal processing unit of FIG. 5.
Figure 7B:
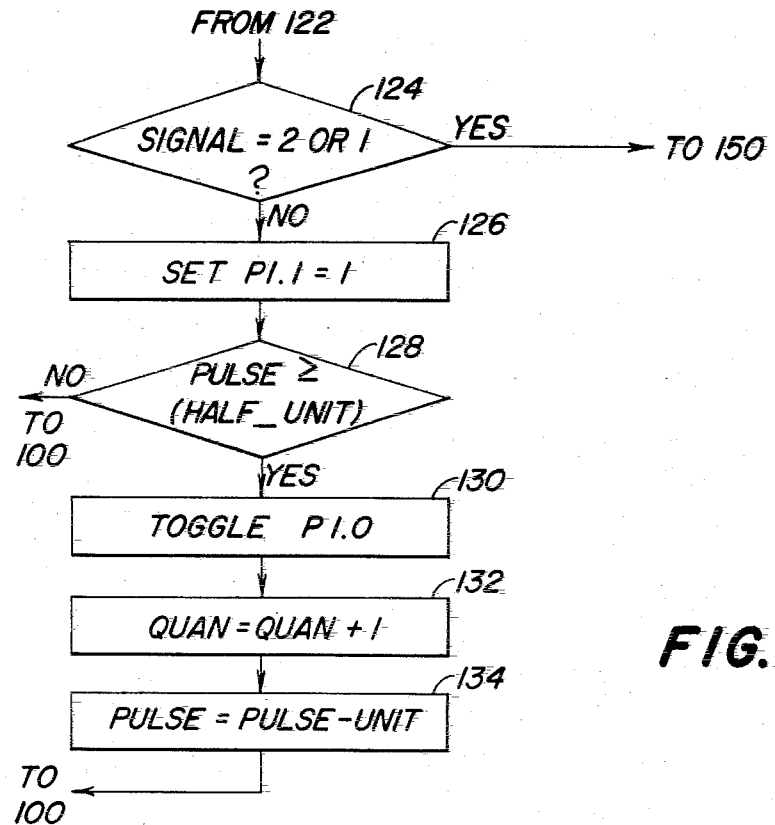
Figure 7C:
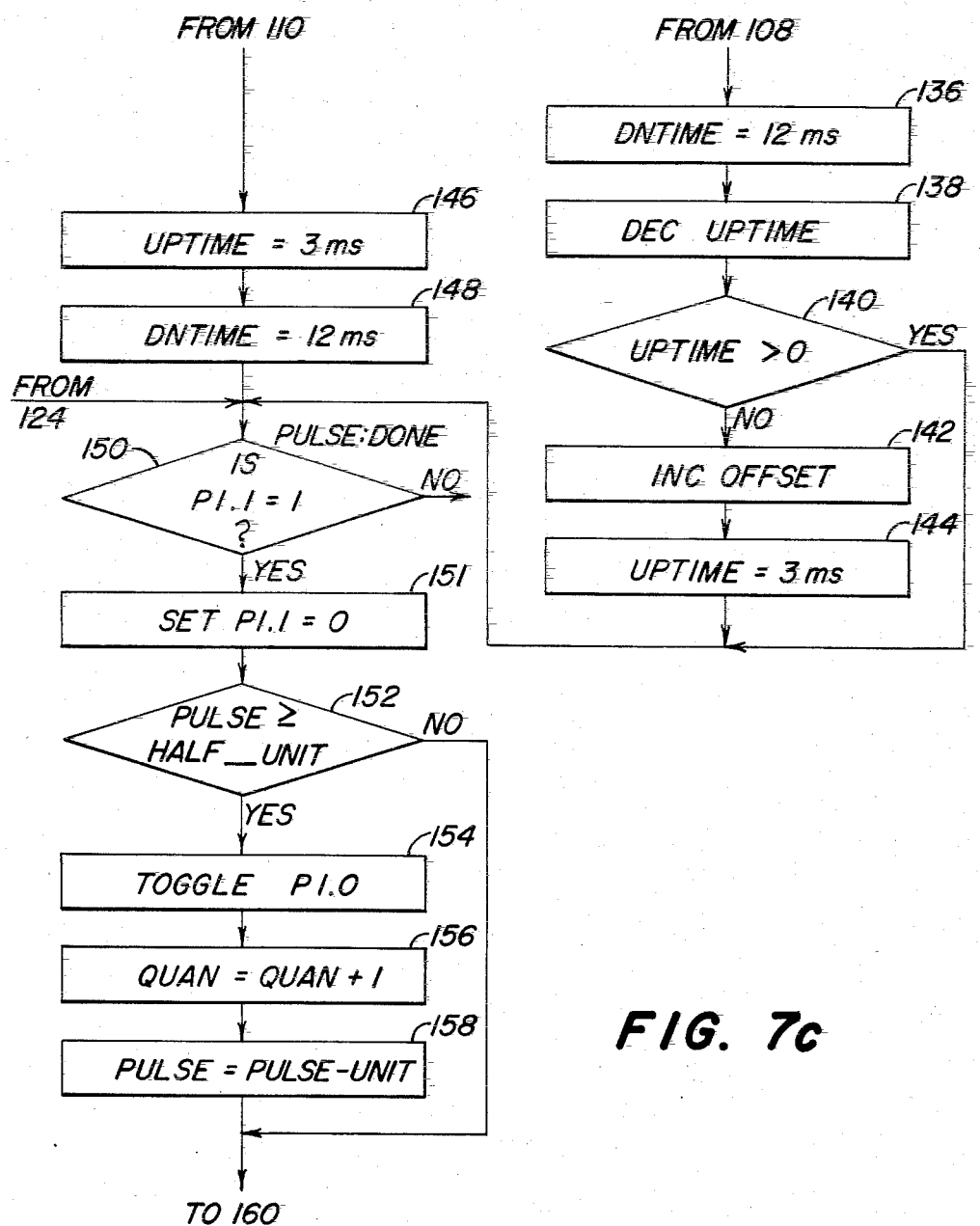
Figure 7D:
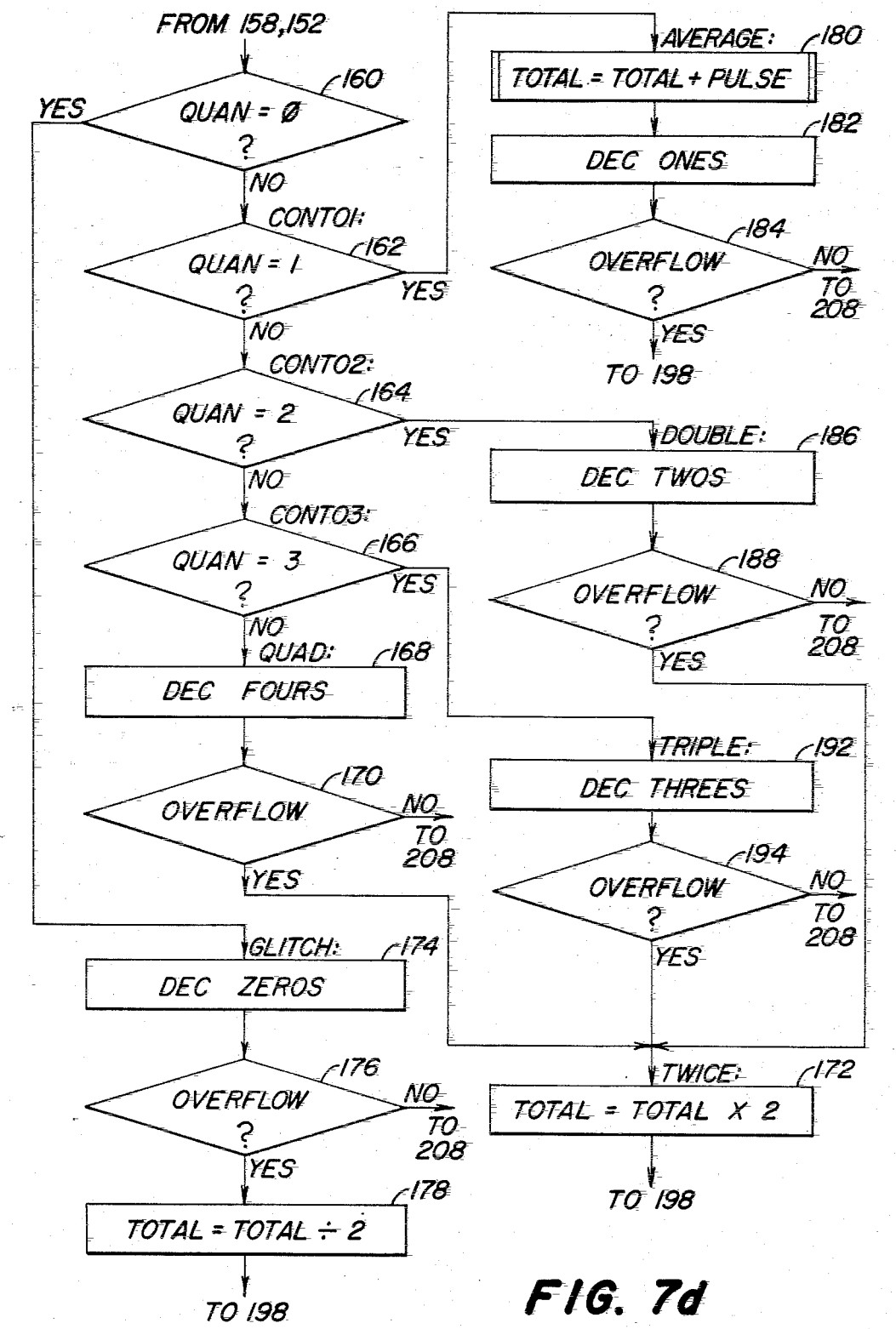
Figure 7E:
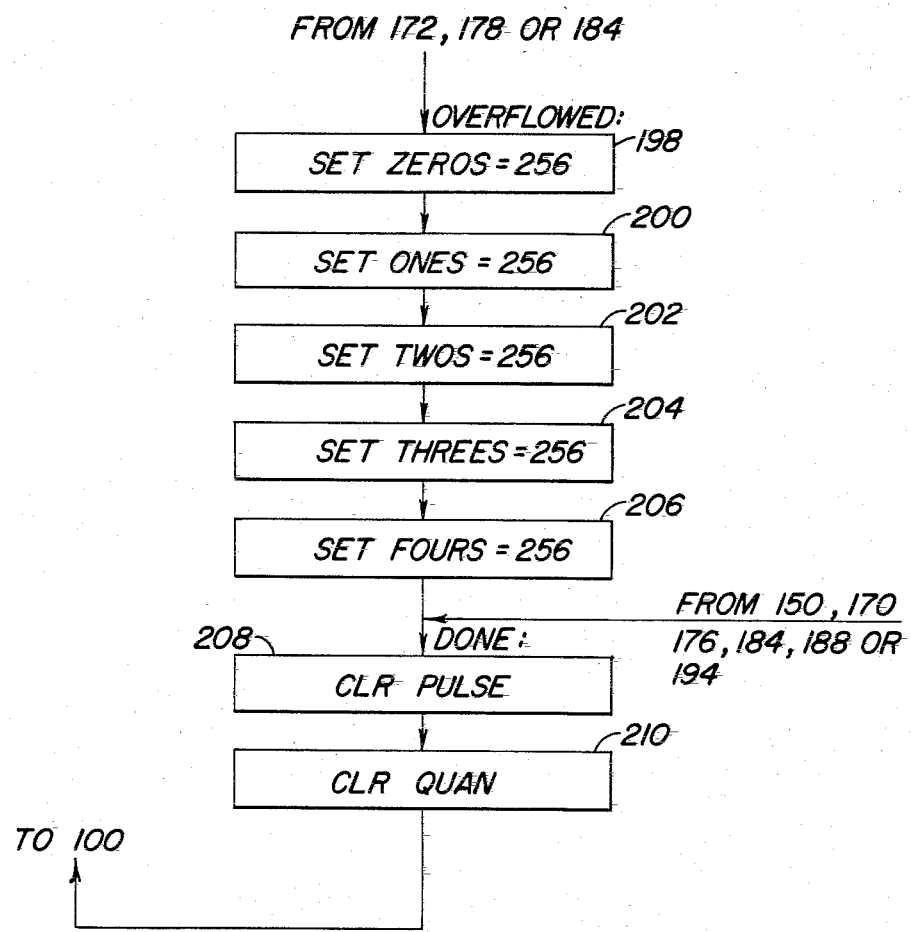

The algorithm or program executed by micro 54 is best understood with reference to the signal timing diagrams of FIG. 6 and to the logic flow diagrams of FIGS. 7a-7e.

Turning first to FIG. 6, the upper waveform is typical of an oscilloscope trace of the voltage at the Vin of A/D converter 52 when articles such as ball bearings are passed through the detector 10. The signal pulses at 60, 68 and 70 are representative of the signal produced by a single article passing through the detector 10. The signal pulses at 64, 66, 74 and 76 are representative of 2 articles passing through the detector 10. Pulse 74 is produced when the 2 articles pass sequentially, one immediately following the other. Pulse 64 is produced when the second article enters the radiation beam before the first article leaves it. Pulses 64 and 66 represent situations where 2 articles pass through the detector nearly simultaneously, or in very close proximity to each other, regardless of the orientation of the article grouping. Pulse 62 is produced by 3 articles passing nearly simultaneously through the detector 10. Pulse 72 is produced by 4 articles passing nearly simultaneously through the detector 10. The paranthetical numbers inside the waveform pulses are proportional to the area circumscribed by the pulses in arbitrary units. These waveforms illustrate that the area circumscribed by each is related to the number of articles which produce the waveform.

It should be noted that a differentiating-type counter would probably incorrectly interpret pulses 62, 64, 66 and 72 as being produced by 1, 1, 2 or 3, and 3 articles, respectively, whereas, these pulses are actually caused by groups of 3, 2, 2 and 4 articles, respectively. The following signal-processing algorithm correctly interprets these pulses as being caused by article counts of 3, 2, 2 and 4, respectively.

Turning now to FIGS. 7a-7e, the algorithm begins at step 100 by setting a HALF_UNIT value equal to ½ of a UNIT value which is initially equal to 768 to represent an initial estimate of the typical area circumscribed by the signal pulse produced by passage of a single article through the sensor apparatus. Such a pulse is shown at 60 of FIG. 6. Then, step 102 causes the algorithm to pause until the internal timer generates a flag signal at 100 micro-second intervals. Upon generation of the flag signal, step 104 causes A/D converter 52 to perform a conversion and input a new digital Vin value (INPUT) into the micro 54. Then, in step 106, a SIGNAL value is set equal to OFFSET - INPUT, where OFFSET represents the possibly slowly varying steady-state level of Vin (normally 4 volts) when no seeds are interrupting the beam B. Thus, when a seed is in the beam B, the SIGNAL value will normally be positive and will represent the vertical depth of the Vin signal (see FIG. 6) at each sampling instant relative to the normal or steady-state value of Vin when no seed is in the beam B.

However, the SIGNAL may be negative if no seed is present and if the OFFSET value is lower than the current steady state Vin level. In this case, step 108 directs the algorithm to steps 136-144. In step 136, an DNTIME timer is initialized to a value representing a 12 msec interval. Step 138 decrements an UPTIME timer. Step 140 routes the algorithm to step 150 if the UPTIME timer has not counted out; otherwise, in step 142, the OFFSET value is incremented by 1 binary count. Finally, step 144 sets the UPTIME timer to a 3 msec value. Thus, the OFFSET value will be incremented if the SIGNAL value remains negative for more than 3 msec.

If SIGNAL is not negative, then step 108 directs the algorithm to step 110 which determines if SIGNAL=0. If yes, it means that no seed is present and that the current OFFSET value appears proper and steps 146 and 148 set the UPTIME and DNTIME timers to values representing 3 milliseconds and 12 milliseconds, respectively. If no, then it means it is possible that a seed or seeds are in the beam B.

In step 112, the UPTIME timer is set to a 3 millisecond value. The DNTIME timer is decremented in step 114. Then, step 116 determines if the DNTIME timer value is greater than zero. If no, it means that SIGNAL has been positive for 12 milliseconds and the OFFSET value is adjusted by 1 digital count in step 118, and the DNTIME timer is again set to a value representing 12 milliseconds. If in step 116 the DNTIME counter is greater than zero (which means that SIGNAL has been positive for less than 12 milliseconds), or after step 120, the algorithm proceeds to step 122.

In step 122, a PULSE value (initially zero), is numerically integrated by adding to its previous value the current SIGNAL value. Thus, the PULSE value represents an area circumscribed by the graphical representation of the Vin signal pulses shown in FIG. 6.

Step 124 determines whether SIGNAL equals a digital count of 2 or 1. If not, it means that SIGNAL must be greater than 2 since steps 108 and 110 have already determined that SIGNAL is non-negative and non-zero. In this case, it means that a seed or seed group has begun or remains in transit through the beam B and the algorithm proceeds to step 126 where a P1.1 flag (initially zero) is set equal to 1. Then, step 128 determines whether the area value PULSE is greater than or equal to the HALF_UNIT value (which represents 50% of the typical area of the signal pulse produced by transit of a single seed.) If PULSE has not attained this 50% area value, then the algorithm returns to step 100 for updating of the SIGNAL value in step 106 and further integration of the PULSE value in step 122. However, if PULSE exceeds the 50% area value, then step 130 causes the signal at micro output port P1.0 to toggle to indicate transit of a seed through the sensor. Next, step 132 increments a QUAN value (initially zero) which represents the total number of seeds in seed group which may be passing through the sensor. Then, step 134 sets the area value, PULSE, equal to (PULSE - UNIT) and returns the algorithm to step 100. This makes the PULSE value negative so the condition of step 128 will again be met only upon additional repetitive integration of the PULSE value by step 122 due to transit of a further seed or seeds of a seed group.

Referring back to step 124, if the SIGNAL value has a digital value of 2 or 1, it is interpreted to mean that the passage of a seed or a seed group through the beam B has just begun or has just been completed (or that noise or negative drift of the bias level has occurred) and the algorithm proceeds to step 150 and further integration of the PULSE value is prevented. Step 150 determines if a P1.1 flag value (initially zero) is equal to 1. If P1.1 does not equal 1, then it means either that step 126 has not yet been executed because there convincing evidence (i.e., SIGNAL>2) that a seed is in transit and that P1.1 was previously cleared to zero at step 151 when the last seed(s) finished. In this case, the algorithm is directed to steps 208-212 wherein the PULSE and QUAN values are cleared and the algorithm is returned to step 100. If, on the other hand, the P1.1 value equals 1 in step 150, then it means a seed transit is just ending and the algorithm is directed to step 151 where P1.1 is cleared.

In step 152, the area value PULSE is compared to the HALF_UNIT area value. If PULSE is less than HALF_UNIT, then the algorithm proceeds to step 160. However, if PULSE is not less than HALF_UNIT, then step 154 causes the micro output port P1.0 to toggle (as at step 130) to indicate transit of a seed through the sensor. Then, the total seed number value, QUAN, is incremented in step 156, and the PULSE value is reset to a negative value in step 158 (as in step 134).

At this point, it is helpful to understand how the value, PULSE, varies as a single seed passes through the beam B. Initially, the PULSE value will be zero. Then, as a seed transit produces a waveform, such as 60 of FIG. 6, the PULSE value will be repetitively integrated by the addition of the increasing SIGNAL values in step 122 until PULSE equals the HALF_UNIT value, at which time, the Vin level reaches a minimum and the SIGNAL value reaches a maximum. Then, step 128 operates to direct the algorithm through steps 130-134, wherein step 134 resets the PULSE value to a negative value, typically equal to −(HALF_UNIT), if the UNIT value accurately represents the area circumscribed by the waveform pulse being processed. Then, during the remainder or second half of waveform 60, step 122 integrates the PULSE value back up so that when Vin returns to its steady state value and when SIGNAL reaches zero, the PULSE value will return to zero, again assuming that the UNIT value was an accurate estimate of the total area of pulse waveform 60.

Now, if, in fact, the estimated area value UNIT, was too large, then at the end of a seed transit, the PULSE value in step 122 will be slightly negative. Thus, as described later in detail, this slightly negative PULSE value will be utilized in algorithm portion 180 to slightly reduce the TOTAL value. Since the TOTAL value is stored as a 3-byte value (each byte consisting of 8 bits) and since, by definition, the UNIT value is that which is stored in the 2 most significant bytes of TOTAL, therefore, a reduction in the TOTAL value also reduces the UNIT value, thus making the UNIT value more closely approximate the typical or average signal pulse area produced by a single seed transit. Similarly, if the estimated area value, UNIT, was too small, then the PULSE value in step 122 (at the end of pulse area integration) will be slightly positive. This will cause the algorithm portion 180 to slightly increase the TOTAL value, and will cause a corresponding increase in the UNIT value for use during the next seed transit. Thus, by adjusting the TOTAL and UNIT values, the algorithm automatically compensates for changes in the average size of seeds passing through the sensor.

Steps 160–210 will now be described. To summarize, steps 160–210 operate to make major adjustments (if ever needed) in the estimated signal pulse area value, UNIT, so that the correct values of UNIT and HALF_UNIT will be utilized in steps 100, 128, 134, 152 and 158.

Steps 160–166 determine whether the QUAN value (initially zero or set in steps 132 or 156) equals 0, 1, 2, 3 or more (representing signal pulses caused by the transit of something less than a seed (QUAN=0) or by the transit of seed groups consisting of 1, 2, 3 or more seeds, respectively).

Under normal conditions, the signal pulse which is produced most often will be that which is caused by the transit of a single article or seed through the beam B, thus QUAN will most often be equal to 1 (assuming a reasonably accurate UNIT value). In this case, step 162 will route the algorithm to a portion of the algorithm represented by 180 which has the effect of deriving an updated TOTAL value equal to the sum of the current TOTAL and residual PULSE values. Since, as previously described, the TOTAL value is related to the UNIT value, this, in effect, repetitively adjusts the UNIT value so that it continues to represent the signal pulse area caused by transit of a single seed. Then, step 182 decrements a ONES counter (initially 256 or reset to 256, at step 200). If the ONES counter is decremented to zero, then step 184 recognizes this overflow condition and routes the algorithm to steps 198–210 which reset the ZEROES, ONES, TWOS, THREES and FOURS counters to 256 and which clear to zero the PULSE and QUAN values so that they can be redetermined by steps 100–158. If the ONES counter has not overflowed, then the algorithm is directed by step 184 directly to steps 208 and 210. Thus, if the UNIT value accurately represents the estimated single seed pulse area, the algorithm will most often incrementally adjust the UNIT value (via adjustment of the TOTAL value in 180), and will continuously reset the ZEROS, TWOS, THREES and FOURS counters in steps 198, 202, 204 and 206 so that the algorithm will never execute step 178 or step 172 which either divides TOTAL by 2 or multiplies TOTAL by 2.

However, if the UNIT value is too large, then the QUAN value will most often be zero because steps 128 and 152 would prevent incrementing of the QUAN value in steps 132 or 156. In this case, the algorithm will most often be directed by step 160 to step 174 which decrements the ZEROES counter. If this situation persists, then step 174 will eventually decrement the ZEROS counter to zero, whereupon step 176 will recognize this overflow condition and will route the algorithm to step 178. Step 178 reduces the TOTAL value by 50% (for example) and thus, causes a corresponding reduction in the UNIT value. Eventually, this process will reduce the UNIT value to a level whereby single seed transits will produce QUAN values equal to 1.

If the estimated pulse area value, UNIT, is too low, then the most often occurring single seed transits can result in QUAN values of 2, 3 or more. In this case, steps 164 and 166 will route the algorithm to steps 186, 192 or 194 where TWOS, THREES and FOURS counters (initially 256 or reset to 256 in steps 202–206) are decremented. When any of these counters reaches zero, then steps 188, 194 or 170 will recognize the overflow condition and will route the algorithm to step 172. Step 172 multiplies the TOTAL value by 2, thus causing an increase in the estimated area value, UNIT. Otherwise, steps 188, 192 and 170 will route the algorithm directly to steps 208 and 210 and thence, back to step 100.

It has been found that it is adequate merely to double the TOTAL value (such as in step 172) regardless of which of the TWOS, THREES or FOURS counters overflows first. However, it would be possible to change the TOTAL value by different amounts, depending upon which counter overflowed first by adding separate TOTAL recalculating steps after each of steps 188, 194 and 170.

Another alternative would be to route the "NO" branch from step 162 directly to step 186 (eliminating steps 164–170, and steps 192–194) and to make the initial and reset value of the ONES counter smaller than that of TWOS counter so that under normal circumstances, the ONES counter will continue to overflow before the TWOS counter (which, in this case, would be decremented upon the transit of any seed group producing a QUAN value of 2 or more.)

At the end of this "Detailed Description" are object and source code listings of the computer program which is illustrated by the logic flow chart of FIGS. 7a–7e. The source code listing includes labels such as READ: and ADDPULSE:, which corresponds to similar labels in the flow chart. There also follows a cross-reference symbol table listing which includes various acronyms used in the flow chart and program listing.

While the invention has been described in conjunction with a specific embodient, it is to be understood that many alternatives, modifications and variations will be apparent to those skilled in the art in light of the aforegoing description. For example, the signal-processing algorithm described herein could be used in conjunction with another type of article or seed sensor as long as the sensor can generate a signal which varies substantially linearly with the number of articles or seeds within it. Accordingly, this invention is intended to embrace all such alternatives, modifications and variations which fall within the spirit and scope of the appended claims.

We claim:

1. In an article sensor having a generator for generating a radiation beam, an article flow path for directing articles through the beam and a beam detector for detecting beam radiation transmitted through the flow path, the improvement wherein:

the beam generator comprises an array of radiation emitters forming a substantially diffused radiation beam which entirely illuminates a cross-sectional portion of the flow path;

the beam detector comprises a planar radiation responsive surface facing towards the array, the detector generating a signal which is a function of the amount of beam radiation received thereby; and a pair of oppositely facing radiation reflectors extending along opposite sides of the flow path between the generator and the detector, the generator, detector and reflectors cooperating so that any article in the flow path will measurably influence the amount of beam radiation received by the detector.

2. The article sensor of claim 1, further comprising: a narrow slot aperture positioned between the flow path and the detector for limiting radiation received by the detector.

3. The article sensor of claim 1, further comprising: a narrow slot aperture positioned between the flow path and the beam generator for preventing radiation from impinging upon articles outside of a predetermined portion of the flow path.

4. The article sensor of claim 1, wherein:
the radiation reflectors are aligned parallel to each other.

5. A seed sensor comprising:
means for forming a seed flow path;
a pair of oppositely facing radiation reflectors extending transversely to the flow path across opposite sides of the flow path;
an array of radiation emitters forming a substantially diffused radiation source extending transversely to the flow path from one reflector to the other;
a planar radiation detector spaced apart from and extending substantially parallel to the source, the flow path being between the source and the detector; and
a radiation blocking shield extending transversely with respect to the flow path and from one reflector to the other reflector, the shield having a radiation transmitting slit therein extending from one reflector to the other, the slit being narrower than a typical seed dimension, the detector generating signals in response to seeds travelling along the flow path between the source and the slit.

6. The seed sensor of claim 5, further comprising:
a radiation transmitting window spaced apart from the source and extending from one reflector to the other reflector between the source and the flow path.

7. The seed sensor of claim 5, wherein:
each reflector extends from the source to the detector.

8. The seed sensor of claim 5, further comprising:
a further radiation blocking shield extending transversely with respect to the flow path and from one reflector to the other reflector, the further shield having a further radiation transmitting slit therein extending from one reflector to the other, the further slit being narrower than a typical seed dimension, the further shield being positioned between the source and the flow path.

9. The seed sensor of claim 5, wherein:
the radiation reflectors are aligned parallel to each other.

10. An article sensor comprising:
means for forming an article flow path;
an array of radiation emitters extending transversely to the flow path along one side of the flow path, the array directing a substantially diffuse and uniform radiation beam across the flow path;
a radiation detector having a planar radiation responsive surface extending transversely to the flow path along a side of the flow path opposite from the array so that any article passing along the flow path between the array and the detector will influence the amount of the beam which is received by the detector, the detector generating a signal representing the amount of the beam received thereby; and
a pair of oppositely facing radiation reflectors extending transversely to the flow path along opposite sides of the flow path between the array and the detector, the reflectors reflecting radiation from the array into the flow path.

11. The article sensor of claim 10, further comprising:
a radiation blocking shield positioned between the flow path and the detector, the shield having a radiation-transmitting slit extending therethrough transversely to the flow path, the slit having a width which is smaller than a typical dimension of one of the articles.

12. The article sensor of claim 10, wherein:
one side of the flow path is formed by a transparent window which is spaced apart from the array, the window being located between the array source and the flow path so that radiation beams from adjacent pairs of the emitters of said array intersect each other at points located between the window and the array.

13. The article sensor of claim 10, further comprising:
a radiation blocking shield positioned between the flow path and the array, the shield having a narrow beam transmitting aperture extending transversely to the flow path, the shield and aperture narrowing the radiation beam which illuminates articles in the flow path and preventing illumination of articles outside of a predetermined portion of the flow path.

14. The article sensor of claim 10, wherein:
the radiation reflectors are aligned parallel to each other.

* * * * *

UNITED STATES PATENT AND TRADEMARK OFFICE
CERTIFICATE OF CORRECTION

PATENT NO.   : 4,634,855    Page 1 of 8
DATED        : 6 January 1987
INVENTOR(S)  : Friend et al.

It is certified that error appears in the above-identified patent and that said Letters Patent is hereby corrected as shown below:

Col. 8, line 60, after "claims.", insert the enclosed Computer Program.
Col. 10 line 39, after "array", delete "source".

Signed and Sealed this

Twenty-ninth Day of September, 1987

Attest:

DONALD J. QUIGG

Attesting Officer    Commissioner of Patents and Trademarks

```
MCS-51 MACRO ASSEMBLER    SEED21

ISIS-II MCS-51 MACRO ASSEMBLER V2.1
OBJECT MODULE PLACED IN :F1:SEED21.OBJ
ASSEMBLER INVOKED BY: ASM51 :F1:SEED21.A51

LOC  OBJ           LINE        SOURCE
                     1         $ XREF PAGELENGTH(62) DEBUG ERRORPRINT NOMACRO
                     2
                     3         ; THIS PROGRAM WAS LAST EDITED AT 5:16 PM ON APRIL 20, 1984.
                     4         ; WRITTEN BY KENNETH FRIEND
                     5
                     6         ; THIS PROGRAM WILL RUN THE 8051 MICROCOMPUTER USED IN THE PLANTER SEED SENSOR.
                     7
                     8
001E                 9         THREE_MILLISECONDS  EQU  3*10
0078                10         TWELVE_MILLISECONDS EQU  12*10
                    11
REG                 12         UPTIME     EQU  R0
REG                 13         DNTIME     EQU  R1
REG                 14         QUAN       EQU  R2
REG                 15         PULSE_HI   EQU  R3
REG                 16         PULSE_LO   EQU  R4
REG                 17         TOTAL_HI   EQU  R5
REG                 18         TOTAL_MI   EQU  R6
REG                 19         TOTAL_LO   EQU  R7
REG                 20         UNIT_HI    EQU  TOTAL_HI
REG                 21         UNIT_LO    EQU  TOTAL_MI
                    22
                    23                    DSEG
0030                24         TEMP:      AT   30H
0031                25         OFFSET:    DS   1
0032                26         SIGNAL:    DS   1
0033                27         HALF_UNIT_HI: DS 1
0034                28         HALF_UNIT_LO: DS 1
0035                29         ZEROS:     DS   1
0036                30         ONES:      DS   1
0037                31         TWOS:      DS   1
0038                32         THREES:    DS   1
0039                33         FOURS:     DS   1
003A                34         GLITCHES:     DS   2
003A                35         GLITCHES_HI   DATA GLITCHES
003B                36         GLITCHES_LO   DATA GLITCHES+1
003C                37         SINGLES:      DS   2
003C                38         SINGLES_HI    DATA SINGLES
003D                39         SINGLES_LO    DATA SINGLES+1
003E                40         DOUBLES:      DS   2
003E                41         DOUBLES_HI    DATA DOUBLES
003F                42         DOUBLES_LO    DATA DOUBLES+1
0040                43         TRIPLES:      DS   2
0040                44         TRIPLES_HI    DATA TRIPLES
0041                45         TRIPLES_LO    DATA TRIPLES+1
0042                46         QUADRUPLES:   DS   2
0042                47         QUADRUPLES_HI DATA QUADRUPLES
0043                48         QUADRUPLES_LO DATA QUADRUPLES+1
                    49
                    50         SEJECT
```

```
MCS-51 MACRO ASSEMBLER          SEED21
LOC  OBJ              LINE      SOURCE 51
                        52              CSEG   AT    000H
0000 2100               53              AJMP   START
                        54
                        55              ORG    100H
0100 E4                 56      START:  CLR    A                       ;\ CLEAR RAM
0101 787F               57              MOV    R0,#7FH                 ;:
0103 F6                 58      LOOP:   MOV    @R0,A                   ;:
0104 D8FD               59              DJNZ   R0,LOOP                 ;/
                        60
0106 0D                 61              INC    UNIT_HI                 ; INITIALIZE UNIT_DB TO 0100H
                        62
0107 758C9C             63              MOV    TH0,#256-100            ;\ SET UP TIMER TO SET TF0 EVERY 100 MICROSECONDS
010A 7589BA             64              MOV    TMOD,#10110010B         ;:
010D D28C               65              SETB   IR0                     ;/
                        66
                        67      INITIALIZE:
0101 7D03               68              MOV    UNIT_HI,#03H            ; INITIALIZE FOR THE APPROXIMATE SIZE OF A SOYBEAN
0111 D2A3               69              SETB   P2.3                    ; START A/D CONVERSION
0113 781E               70              MOV    UPTIME,#THREE_MILLISECONDS
0115 7978               71              MOV    DNTIME,#TWELEVE_MILLISECONDS
0117 858031             72              MOV    OFFSET,P0               ; INITIALIZE OFFSET
                        73
                        74      ;***************************************************************
                        75      ;*  START OF MAIN LOOP                                         *
                        76      ;*  EXECUTES AT EVERY 100 MICROSECOND TICK FROM THE TIMER.     *
                        77      ;***************************************************************
                        78      MAIN_LOOP:                              ; THIS IS THE START OF THE MAIN LOOP
011A C3                 79              CLR    C
011B ED                 80              MOV    A,UNIT_HI
011C 13                 81              RRC    A
011D F533               82              MOV    HALF_UNIT_HI,A          ;\ HALF_UNIT_DB <- (UNIT_DB / 2)
011F EE                 83              MOV    A,UNIT_LO               ;/
0120 13                 84              RRC    A
0121 F534               85              MOV    HALF_UNIT_LO,A
                        86
0123 308DFD             87      WAIT:   JNB    TF0,WAIT                ;\ WAIT HERE TILL 100 MICROSECOND TICK
0126 C28D               88              CLR    TF0                     ;/
                        89
0128 C2A2               90      READ:   CLR    P2.2                    ;\ ASSURANCE THAT "NOT READ" LINE IS LOW
012A C2A4               91              CLR    P2.4                    ;: ASSURANCE THAT CHIP SELECT LINE IS LOW
012C C2A3               92              CLR    P2.3                    ;: PULSE LOW THE "NOT WRITE" LINE TO START CONVERSION
012E D2A3               93              SETB   P2.3                    ;/
0130 C3                 94              CLR    C                       ;\
0131 E531               95              MOV    A,OFFSET                ;: SIGNAL <- OFFSET - INPUT
0133 9580               96              SUBB   A,P0                    ;:
0135 F532               97              MOV    SIGNAL,A                ;/
                        98
0137 403C               99              JC     SIG_NEG                 ; JUMP IF SIGNAL IS NEGATIVE
0139 6034              100              JZ     SIG_ZERO                ; JUMP IS SIGNAL IS ZERO
                       101
                       102      SIG_POS:
013B 781E              103              MOV    UPTIME,#THREE_MILLISECONDS
013D D904              104              DJNZ   DNTIME,ADDPULSE         ; JUMP AROUND IF NO CHANGE IN OFFSET NEEDED
013F 1531              105              DEC    OFFSET
0141 7978              106              MOV    DNTIME,#TWELEVE_MILLISECONDS
                       107      ADDPULSE:
```

MCS-51 MACRO ASSEMBLER    SEED21                                                    PAGE  3

| LOC | OBJ | LINE | SOURCE | | |
|---|---|---|---|---|---|
| 0143 | EC | 108 | | MOV | A,PULSE_LO |
| 0144 | 2532 | 109 | | ADD | A,SIGNAL |
| 0146 | FC | 110 | | MOV | PULSE_LO,A |
| 0147 | E4 | 111 | | CLR | A |
| 0148 | 3B | 112 | | ADDC | A,PULSE_HI |
| 0149 | FB | 113 | | MOV | PULSE_HI,A  ; PULSE_DB <- PULSE_DB + SIGNAL |
| | | 114 | | | |
| 014A | D53202 | 115 | | DJNZ | SIGNAL_NOT_1 |
| 014D | 217D | 116 | | AJMP | PULSE_DONE  ; JUMP TO PULSE_DONE IF SIGNAL .EQ. (1 .OR. 2) |
| 014F | D53202 | 117 | NOT_1: | DJNZ | SIGNAL_NOT_1_OR_2 |
| 0152 | 217D | 118 | | AJMP | PULSE_DONE |
| | | 119 | | | |
| | | 120 | NOT_1_OR_2: | ; TO GET TO THIS POINT A SEED PULSE IS PROBABLY OCCURRING. |
| 0154 | D291 | 121 | | SETB | P1.1  ; SET FLAG TO INDICATE SEED DETECTION STARTED |
| 0156 | EB | 122 | | MOV | A,PULSE_HI |
| 0157 | 20E7C0 | 123 | | JB | ACC.7,MAIN_LOOP  ; JUMP TO MAIN_LOOP IF PULSE_DB .LT. (UNIT_DB / 2) |
| 015A | C3 | 124 | | CLR | C |
| 015B | EC | 125 | | MOV | A,PULSE_LO |
| 015C | 9534 | 126 | | SUBB | A,HALF_UNIT_LO |
| 015E | EB | 127 | | MOV | A,PULSE_HI |
| 015F | 9533 | 128 | | SUBB | A,HALF_UNIT_HI |
| 0161 | 40B7 | 129 | | JC | MAIN_LOOP |
| 0163 | B290 | 130 | | CPL | P1.0  ; OUTPUT 1 EDGE TO INDICATE 1 SEED SENSED |
| 0165 | 0A | 131 | | INC | QUAN |
| 0166 | A3 | 132 | | INC | DPTR  ; DEBUG |
| 0167 | EC | 133 | | MOV | A,PULSE_LO |
| 0168 | 9E | 134 | | SUBB | A,UNIT_LO |
| 0169 | FC | 135 | | MOV | PULSE_LO,A |
| 016A | EB | 136 | | MOV | A,PULSE_HI |
| 016B | 9D | 137 | | SUBB | A,UNIT_HI |
| 016C | FB | 138 | | MOV | PULSE_HI,A  ; PULSE_DB <- PULSE_DB - UNIT_DB |
| 016D | 211A | 139 | | AJMP | MAIN_LOOP |
| | | 140 | | | |
| 016F | 781E | 141 | SIG_ZERO: | MOV | UPTIME,#THREE_MILLISECONDS |
| 0171 | 7978 | 142 | | MOV | DNTIME,#TWELEVE_MILLISECONDS |
| 0173 | 217D | 143 | | AJMP | PULSE_DONE |
| | | 144 | | | |
| | | 145 | | | |
| 0175 | 7978 | 146 | SIG_NEG: | MOV | DNTIME,#TWELEVE_MILLISECONDS |
| 0177 | D804 | 147 | | DJNZ | UPTIME,PULSE_DONE |
| 0179 | 0531 | 148 | | INC | OFFSET |
| 017B | 781E | 149 | | MOV | UPTIME,#THREE_MILLISECONDS |
| | | 150 | | | |
| | | 151 | PULSE_DONE: | ; AT THIS POINT, SIGNAL IS ZERO, ONE, TWO, OR NEGATIVE (NO PULSE IS OCCURRING) |
| 017D | 109102 | 152 | | JBC | P1.1,CONT  ; JUMP TO DONE IF NO SEED HAS STARTED |
| 0180 | 411E | 153 | | AJMP | DONE |
| 0182 | EB | 154 | CONT: | MOV | A,PULSE_HI |
| 0183 | 20E713 | 155 | | JB | ACC.7,RECORD |
| 0186 | C3 | 156 | | CLR | C |
| 0187 | EC | 157 | | MOV | A,PULSE_LO |
| 0188 | 9534 | 158 | | SUBB | A,HALF_UNIT_LO |
| 018A | EB | 159 | | MOV | A,PULSE_HI |
| 018B | 9533 | 160 | | SUBB | A,HALF_UNIT_HI |
| 018D | 400A | 161 | | JC | RECORD  ; JUMP AROUND IF PULSE_DB .LT. (UNIT_DB / 2) |
| 018F | B290 | 162 | | CPL | P1.0  ; OUTPUT 1 EDGE TO INDICATE 1 SEED SENSED |
| 0191 | 0A | 163 | | INC | QUAN |

```
MCS-51 MACRO ASSEMBLER    SEED21

LOC   OBJ        LINE   SOURCE
0192  A3         165            INC     DPTR
0193  FC         166            MOV     A,PULSE_LO
0194  9E         167            SUBB    A,UNIT_LO
0195  FC         168            MOV     PULSE_LO,A
0196  EB         169            MOV     A,PULSE_HI
0197  9D         170            SUBB    A,UNIT_HI
0198  FB         171            MOV     PULSE_HI,A
                 172    ;......\
0199  BA001A     173            CJNE    QUAN,#0,CONTO1      ; DEBUG
019C  7401       174    RECORD: MOV     A,#1
019E  253B       175    GLITCH: ADD     A,GLITCHES_LO       ; PULSE_DB <- PULSE_DB - UNIT_DB
01A0  F53B       176            MOV     GLITCHES_LO,A
01A2  E4         177            CLR     A
01A3  353A       178            ADDC    A,GLITCHES_HI       ; JUMP IF NOT A GLITCH
01A5  F53A       179            MOV     GLITCHES_HI,A
01A7  D53574     180            DJNZ    ZEROS,DONE          ; INCREMENT THE NUMBER OF GLITCHES FOUND  DEBUG
                 181    ;......\
01AA  C3         182    HALVE:  CLR     C                   ; JUMP IF NOT TOO MANY GLITCHES FOUND
01AB  ED         183            MOV     A,TOTAL_HI
01AC  13         184            RRC     A
01AD  FD         185            MOV     TOTAL_HI,A
01AE  EE         186            MOV     A,TOTAL_MI          ; TOTAL_TR <- TOTAL_TR / 2
01AF  13         187            RRC     A                   ; UNIT_DB  <- UNIT_DB  / 2
01B0  FE         188            MOV     TOTAL_MI,A
01B1  EF         189            MOV     A,TOTAL_LO
01B2  13         190            RRC     A
01B3  FF         191            MOV     TOTAL_LO,A
01B4  4113       192            AJMP    OVERFLOWED
                 193    ;......\
01B6  DA1F       194    CONTO1: DJNZ    QUAN,CONTO2         ; JUMP IF NOT A SINGLE
01B8  7401       195    SINGLE: MOV     A,#1
01BA  253D       196            ADD     A,SINGLES_LO
01BC  F53D       197            MOV     SINGLES_LO,A        ; INCREMENT THE NUMBER OF SINGLES FOUND  DEBUG
01BE  E4         198            CLR     A
01BF  353C       199            ADDC    A,SINGLES_HI
01C1  F53C       200            MOV     SINGLES_HI,A
                 201    ;......\
01C3  EF         202    AVERAGE: MOV    A,TOTAL_LO
01C4  2C         203            ADD     A,PULSE_LO
01C5  FF         204            MOV     TOTAL_LO,A
01C6  EE         205            MOV     A,TOTAL_MI
01C7  3B         206            ADDC    A,PULSE_HI          ; TOTAL_TR <- TOTAL_TR + PULSE_DB
01C8  FE         207            MOV     TOTAL_MI,A
01C9  E4         208            CLR     A
01CA  8BF0       209            MOV     B,PULSE_HI
01CC  30F701     210            JNB     B.7,AROUND
01CF  F4         211            CPL     A
01D0  3D         212    AROUND: ADDC    A,TOTAL_HI
01D1  FD         213            MOV     TOTAL_HI,A
01D2  D53649     214            DJNZ    ONES,DONE           ; ENOUGH SINGLES WERE FOUND TO BE CONSIDERED LOCKED-ON
01D5  4113       215            AJMP    OVERFLOWED
                 216    ;......\
01D7  DA10       217    CONTO2: DJNZ    QUAN,CONTO3         ; JUMP IF NOT A DOUBLE
01D9  7401       218    DOUBLE: MOV     A,#1
01DB  251F       219            ADD     A,DOUBLES_LO
01DD  F53F       220            MOV     DOUBLES_LO,A        ; INCREMENT THE NUMBER OF DOUBLES FOUND  DEBUG
01DF  E4         221            CLR     A
```

MCS-51 MACRO ASSEMBLER    SEED21

```
LOC   OBJ         LINE  SOURCE

01E0  353E         222        ADDC   A,DOUBLES_HI
01E2  F53E         223        MOV    DOUBLES_HI,A
01E4  D53737       224        DJNZ   TWOS,DONE
01E7  4109         225        AJMP   TWICE                    ; TOO MANY DOUBLES FOUND
                   226
01E9  DA10         227  CONI03: DJNZ  QUAN,QUAD
01EB  7401         228  TRIPLE: MOV   A,#1                    ; JUMP IF NOT A TRIPLE
01ED  2541         229        ADD    A,TRIPLES_LO
01EF  F541         230        MOV    TRIPLES_LO,A             ; INCREMENT THE NUMBER OF TRIPLES FOUND    DEBUG
01F1  E4           231        CLR    A
01F2  3540         232        ADDC   A,TRIPLES_HI
01F4  F540         233        MOV    TRIPLES_HI,A
01F6  D53825       234        DJNZ   THREES,DONE
01F9  2109         235        AJMP   DOUBLE                   ; TOO MANY TRIPLES FOUND
                   236
01FB  7401         237  QUAD:  MOV   A,#1
01FD  2543         238        ADD    A,QUADRUPLES_LO
01FF  F543         239        MOV    QUADRUPLES_LO,A          ; INCREMENT THE NUMBER OF QUADRUPLES FOUND  DEBUG
0201  E4           240        CLR    A
0202  3542         241        ADDC   A,QUADRUPLES_HI
0204  F542         242        MOV    QUADRUPLES_HI,A
0206  D53915       243        DJNZ   FOURS,DONE               ; JUMP IF TOO MANY QUADRUPLES AND ABOVE FOUND
                   244
0209  C3           245  TWICE: CLR   C
020A  EF           246        MOV    A,TOTAL_LO
020B  33           247        RLC    A
020C  FF           248        MOV    TOTAL_LO,A               ; TOTAL_TR <- TOTAL_TR * 2
020D  EE           249        MOV    A,TOTAL_MI               ; UNIT_DB  <- UNIT_DB * 2
020E  33           250        RLC    A
020F  FE           251        MOV    TOTAL_MI,A
0210  ED           252        MOV    A,TOTAL_HI
0211  33           253        RLC    A
0212  FD           254        MOV    TOTAL_HI,A
                   255
                   256  OVERFLOWED:
0213  E4           257        CLR    A
0214  F535         258        MOV    ZEROS,A
0216  F536         259        MOV    ONES,A
0218  F537         260        MOV    TWOS,A
021A  F538         261        MOV    THREES,A
021C  F539         262        MOV    FOURS,A
021E  7B00         263        MOV    PULSE_HI,#0
0220  7C00         264  DONE:  MOV   PULSE_LO,#0
0222  7A00         265        MOV    QUAN,#0
0224  211A         266        AJMP   MAIN_LOOP
                   267
                   268        END
```

MCS-51 MACRO ASSEMBLER    SEED21

XREF SYMBOL TABLE LISTING

| N A M E | T Y P E | V A L U E | ATTRIBUTES AND REFERENCES |
|---|---|---|---|
| ACC. . . . . . . . . . . . . . | D ADDR | 00E0H | A | 123 156 |
| ADOPULSE . . . . . . . . . . . | C ADDR | 0143H | A | 104 107# |
| AROUND . . . . . . . . . . . . | C ADDR | 01D0H | A | 210 212# |
| AVERAGE. . . . . . . . . . . . | D ADDR | 01C3H | A | 201# |
| B. . . . . . . . . . . . . . . | D ADDR | 00F0H | A | 209 210 |
| CONT . . . . . . . . . . . . . | C ADDR | 0182H | A | 153 155# |
| CON101 . . . . . . . . . . . . | C ADDR | 01B6H | A | 173 194# |
| CON102 . . . . . . . . . . . . | C ADDR | 01D7H | A | 194 217# |
| CON103 . . . . . . . . . . . . | C ADDR | 01F9H | A | 217 227# |
| DNTIME . . . . . . . . . . . . | REG | R1 | A | 13# 71 104 106 143 147 |
| DONE . . . . . . . . . . . . . | C ADDR | 021EH | A | 154 180 214 224 234 243 263# |
| DOUBLE . . . . . . . . . . . . | C ADDR | 01D9H | A | 218# 235 |
| DOUBLES_HI . . . . . . . . . . | D ADDR | 0031H | A | 41# 222 223 |
| DOUBLES_LO . . . . . . . . . . | D ADDR | 0036H | A | 42# 219 220 |
| DOUBLES. . . . . . . . . . . . | D ADDR | 003EH | A | 40# 41 42 |
| FOURS. . . . . . . . . . . . . | D ADDR | 0039H | A | 33# 243 262 |
| GLITCH . . . . . . . . . . . . | C ADDR | 019CH | A | 174# |
| GLITCHES_HI. . . . . . . . . . | D ADDR | 003AH | A | 35# 178 179 |
| GLITCHES_LO. . . . . . . . . . | D ADDR | 003BH | A | 36# 175 176 |
| GLITCHES . . . . . . . . . . . | D ADDR | 003AH | A | 34# 35 36 |
| HALF_UNIT_HI . . . . . . . . . | D ADDR | 0033H | A | 27# 82 128 161 |
| HALF_UNIT_LO . . . . . . . . . | D ADDR | 0034H | A | 28# 85 126 159 |
| HALVE. . . . . . . . . . . . . | C ADDR | 01AAH | A | 182# |
| INITIALIZE . . . . . . . . . . | C ADDR | 010FH | A | 67# |
| LOOP . . . . . . . . . . . . . | C ADDR | 0103H | A | 58# 59 |
| MAIN_LOOP. . . . . . . . . . . | C ADDR | 011AH | A | 78# 123 129 139 266 |
| NOT_1_OR_2 . . . . . . . . . . | C ADDR | 0154H | A | 117 120# |
| NOT_1. . . . . . . . . . . . . | C ADDR | 014FH | A | 115 117# |
| OFFSET . . . . . . . . . . . . | D ADDR | 0031H | A | 25# 72 95 105 149 |
| ONES . . . . . . . . . . . . . | D ADDR | 0036H | A | 30# 214 259 |
| OVERFLOWED . . . . . . . . . . | D ADDR | 0213H | A | 192 215 256# |
| P0 . . . . . . . . . . . . . . | D ADDR | 0080H | A | 72 96 |
| P1 . . . . . . . . . . . . . . | D ADDR | 0090H | A | 121 130 153 163 |
| P2 . . . . . . . . . . . . . . | D ADDR | 00A0H | A | 69 90 91 92 93 |
| PULSE_DONE . . . . . . . . . . | C ADDR | 017DH | A | 116 118 144 148 152# |
| PULSE_HI . . . . . . . . . . . | REG | R3 | A | 15# 112 113 122 127 136 138 155 160 169 171 206 209 263 |
| PULSE_LO . . . . . . . . . . . | REG | R4 | A | 16# 108 110 125 133 135 158 166 168 203 264 |
| QUAD . . . . . . . . . . . . . | C ADDR | 01FBH | A | 227 237# |
| QUADRUPLES_HI. . . . . . . . . | D ADDR | 0042H | A | 47# 241 242 |
| QUADRUPLES_LO. . . . . . . . . | D ADDR | 0043H | A | 48# 238 239 |
| QUADRUPLES . . . . . . . . . . | D ADDR | 0042H | A | 46# 47 48 |
| QUAN . . . . . . . . . . . . . | REG | R2 | A | 14# 131 164 173 194 217 227 265 |
| READ . . . . . . . . . . . . . | C ADDR | 0128H | A | 90# |
| RECORD . . . . . . . . . . . . | C ADDR | 0199H | A | 156 162 173# |
| SIG_NEG. . . . . . . . . . . . | C ADDR | 0175H | A | 99 146# |
| SIG_POS. . . . . . . . . . . . | C ADDR | 013BH | A | 102# |
| SIG_ZERO . . . . . . . . . . . | C ADDR | 016FH | A | 100 141# |
| SIGNAL . . . . . . . . . . . . | D ADDR | 0032H | A | 26# 97 109 115 117 |
| SINGLE . . . . . . . . . . . . | C ADDR | 01B8H | A | 195# |
| SINGLES_HI . . . . . . . . . . | D ADDR | 003CH | A | 38# 199 200 |
| SINGLES_LO . . . . . . . . . . | D ADDR | 003DH | A | 39# 196 197 |
| SINGLES. . . . . . . . . . . . | D ADDR | 003CH | A | 37# 38 39 |
| START. . . . . . . . . . . . . | C ADDR | 0100H | A | 53 56# |

MCS-51 MACRO ASSEMBLER    SEED21                                                                PAGE  7

| N A M E | T Y P E | V A L U E | ATTRIBUTES AND REFERENCES |
|---|---|---|---|
| TEMP. . . . . . . . . . . . . | D ADDR | 0030H   A | 24# |
| TF0. . . . . . . . . . . . . . | B ADDR | 0088H.5 A | 87 88 |
| TH0. . . . . . . . . . . . . . | D ADDR | 008CH   A | 63 |
| THREE_MILLISECONDS. . . . . . | D NUMB | 001EH   A | 9#  70 103 142 150 |
| THREES . . . . . . . . . . . . | D ADDR | 0038H   A | 32# 234 261 |
| TMOD . . . . . . . . . . . . . | D ADDR | 0089H   A | 64 |
| TOTAL_HI . . . . . . . . . . . | REG   | R5        | 17# 20 183 185 212 213 252 254 |
| TOTAL_LO . . . . . . . . . . . | REG   | R7        | 19# 189 191 202 204 246 248 |
| TOTAL_MI . . . . . . . . . . . | REG   | R6        | 18# 21 186 188 205 207 249 251 |
| TR0. . . . . . . . . . . . . . | B ADDR | 0088H.4 A | 65 |
| TRIPLE . . . . . . . . . . . . | C ADDR | 01EBH   A | 228# |
| TRIPLES_HI . . . . . . . . . . | D ADDR | 0040H   A | 44# 232 233 |
| TRIPLES_LO . . . . . . . . . . | D ADDR | 0041H   A | 45# 229 230 |
| TRIPLES. . . . . . . . . . . . | D ADDR | 0040H   A | 43# 44 45 |
| TWELVE_MILLISECONDS. . . . . . | D NUMB | 0078H   A | 10# 71 106 143 147 |
| TWICE. . . . . . . . . . . . . | C ADDR | 0209H   A | 225 245# |
| TWOS . . . . . . . . . . . . . | D ADDR | 0037H   A | 31# 224 260 |
| UNIT_HI. . . . . . . . . . . . | REG   | R5        | 20# 61 68 80 137 170 |
| UNIT_LO. . . . . . . . . . . . | REG   | R6        | 21# 83 134 167 |
| UPTIME . . . . . . . . . . . . | REG   | R0        | 12# 70 103 142 148 150 |
| WAIT . . . . . . . . . . . . . | C ADDR | 0123H   A | 87# 87 |
| ZEROS. . . . . . . . . . . . . | D ADDR | 0035H   A | 29# 180 258 |

REGISTER BANK(S) USED: 0
ASSEMBLY COMPLETE, NO ERRORS FOUND